United States Patent Office 3,178,420
Patented Apr. 13, 1965

3,178,420
AMINO-2-HYDROXY-1-PROPOXY BENZAL DERIVATIVES OF FLUORENE AND XANTHENE
Frank P. Palopoli, Albert A. Carr, Vernon J. Feil, Geraldine L. Krueger, and William L. Kuhn, all of Cincinnati, Ohio, assignors to Richardson-Merrell Inc., a corporation of Delaware
No Drawing. Filed June 25, 1959, Ser. No. 822,747
5 Claims. (Cl. 260—240)

This invention relates to new and useful chemical compounds, to novel intermediates for the preparation of these new compounds and to processes of preparing and using the new chemical compounds to be described.

The novel compounds of the present invention may be represented by the following general formulas:

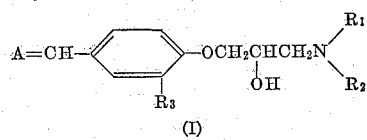

(I)

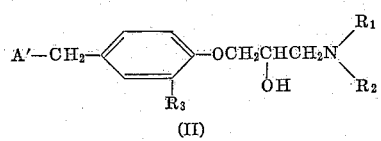

(II)

in which $R_1$ and $R_2$ are selected from hydrogen, lower alkyl containing from one to four carbon atoms, or aralkyl, and $R_1$ and $R_2$ together with the nitrogen to which they are attached form a heterocycle, such as morpholino, piperidino, pyrrolidino, 1,2,5,6-tetrahydropyridino, succinimido and phthalimido, $R_3$ is hydrogen or methoxy. A is a 9-fluorenylidene or a 9-xanthylidene radical and A' is a 9-fluorenyl or 9-xanthyl radical. Structurally A and A' may be pictured as follows:

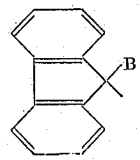

and

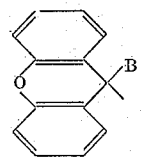

wherein B represents a bond when A is fluorenylidene or xanthylidene as in the benzal compounds (Type I), and B represents hydrogen when A' is a fluorenyl or xanthyl radical as in the benzyl compounds (Type II).

The compounds of the invention are basic and may be used in the form of their free bases, acid addition salts and quaternary ammonium salts. The acid addition salts include the hydrochloride, hydrobromide, thymosulfate, maleate, succinate, citrate and other pharmaceutically acceptable salts. The quaternary ammonium salts include the methiodide, ethiodide, methobromide, methosulfate and other pharmaceutically suitable quaternaries.

Compounds having the above general formulas have useful analgesic activity and are useful in the treatment of pain caused by inflammatory processes, such as infections, arthritis and rheumatism and for headaches and other painful conditions. Apparently, the introduction of a hydroxyl group in the position shown in the general formula above imparts analgesic activity to compounds which are otherwise essentially devoid of this valuable property.

These compounds are effective as analgesics when administered by either the oral or the parenteral route. The average daily dose may vary from 10 to 2000 mg. when administered by the oral route, and from 10 to 500 mg. when administered parenterally. When administered orally, the compound may be enclosed usually with a pharmaceutically acceptable carrier in gelatin capsules or may be compressed into tablets or compounded into any other pharmaceutical carrier suitable for oral administration.

The unit dosages may be made to contain any suitable amount of the compound, for instance, 300 mg. tablets which may be administered four times per day.

For parenteral administration, the compounds may be dissolved or suspended in a suitable liquid vehicle, such as isotonic saline or vegetable oils, and injected intramuscularly or intraperitoneally. It will be understood, of course, that the exact dosage, the frequency and route of administration will be determined by the attending physician or veterinarian, in accordance with his best judgment, depending upon the size, age and condition of the patient and other factors.

Some of the compounds having the above structure also possess other useful physiological properties, such as anti-inflammatory, anti-estrogenic, anti-gonadotrophic and uterotrophic activities in varying degrees.

The novel benzal compounds of Formula I can be prepared by the reaction of a hydroxybenzal compound substituted with an A group, with an epihalohydrin, followed by reaction with a suitable amine, as for example;

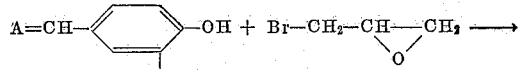

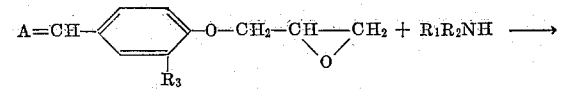

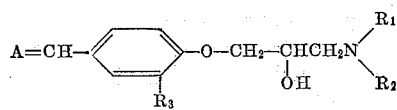

(I)

The novel benzyl compounds of Formula II are prepared by reaction of a hydroxybenzyl compound, substituted with an A' group, with an epihalohydrin, followed by reaction with a suitable amine as described above. The hydroxybenzyl starting materials are prepared by hydrogenation of a hydroxybenzal compound, substituted with an A group, either catalytically with platinum or palladium on charcoal, or chemically with hydriodic acid containing 1.5 percent hypophosphorous acid.

The novel benzyl compounds of Formula II can also be prepared by the catalytic hydrogenation of the corresponding aminohydroxyalkoxybenzal compounds;

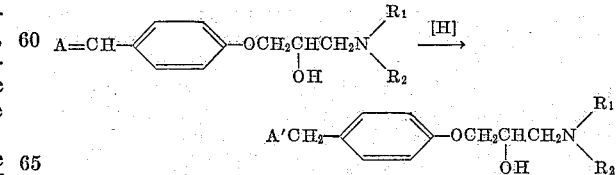

The novel benzal and benzyl compounds in which $R_1$ and $R_2$ are hydrogen may be prepared by the reaction of the epoxypropoxy benzal and benzyl compounds substituted with an A group with succinimide, followed by hydrolysis of the imide with hydrochloric acid.

The hydroxybenzal intermediates used to prepare the new benzal compounds can be prepared by the following general methods;

(1) Reacting a compound from which A is derived, e.g., fluorene, with methoxybenzaldehyde in the presence of a condensing agent such as sodium methoxide or ethoxide or piperidine to form the corresponding methoxybenzal compound and demethylating, for example, with pyridine hydrochloride, hydrobromic acid or aluminum chloride to produce the hydroxybenzal compound

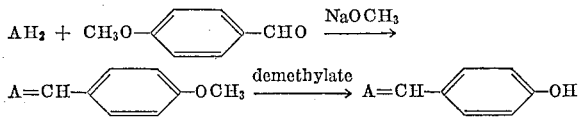

(2) Reacting the $AH_2$ starting compound of (1) with hydroxybenzaldehyde,

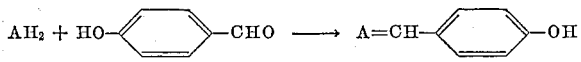

(3) Reacting a ketone containing A with a methoxybenzyl magnesium halide to form the corresponding methoxybenzal compound and demethylating as in method (1),

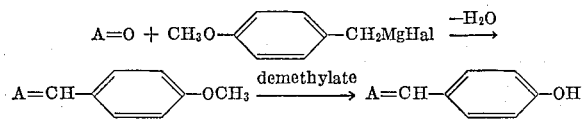

The novel compounds of our invention will be further illustrated by the following examples.

EXAMPLE I

*9-[p-(3-diethylamino-2-hydroxy-1-propoxy) benzal]fluorene hydrochloride*

A mixture of 382 g. of 9-(p-methoxybenzal)fluorene and 770 g. of pyridine hydrochloride was heated at 210° C. for three hours, cooled and the mixture was shaken in water and ether. The ether solution was extracted twice with ten percent sodium hydroxide solution; this alkaline solution was rendered acidic with concentrated hydrochloric acid, and the residue was taken up into benzene. By reducing the volume of the benzene solution and allowing it to stand at room temperature for prolonged periods, crystals of 9-(p-hydroxybenzal) fluorene were obtained, melting at 110–112° C. This intermediate appears to be a new compound. This phenol was sufficiently pure for subsequent reactions. The residue obtained by acidification of the above alkaline solution was taken up in a known volume of ethanol or dry tetrahydrofuran and aliquot portions used.

A mixture of 11.5 g. of 9-(p-hydroxybenzal)fluorene and 2.3 g. of sodium methoxide in 100 ml. of tetrahydrofuran was stirred for thirty minutes, 11.5 g. of epibromohydrin was added and the mixture refluxed for two hours. The sodium bromide which separated was removed by filtration, and the solvent and excess epibromohydrin removed under reduced pressure. The residue, 9-[p-(2,3-epoxy-1-propoxy)benzal]fluorene, a new compound, did not crystallize and was used without further purification.

A mixture of the above residue and an excess of diethylamine was heated in a pressure bottle for three hours at 95° C. The excess diethylamine was removed, and the residue dissolved in ether and washed with ten percent sodium hydroxide solution, then water, and dried over anhydrous magnesium sulfate. After rendering this solution slightly acidic with alcoholic hydrogen chloride and removing the solvents, the product was crystallized from ethanol to give 8.5 g. of 9-[p-(3-diethylamino-2-hydroxy-1-propoxy)benzal]fluorene hydrochloride melting at 164–166° C. Similar yields were obtained by refluxing with excess amine rather than heating in a pressure bottle.

As an analgesic this compound had an $ED_{50}$ in mice of 21 mg. per kg. of body weight when injected intraperitoneally and 223 mg. per kg. when administered orally when measured by the standard hot plate method. No significant cardiovascular or anti-convulsant activity was observed. The $LD_{50}$ was found to be 240 mg. per kg. of body weight when injected intraperitoneally in mice and 900 mg. per kg. of body weight when administered orally. Symptoms of toxicity were evidenced by tremor, ataxia and anoxia at the higher doses.

EXAMPLE II

*9-[p-(3-N-piperidyl-2-hydroxy-1-propoxy)benzal] fluorene hydrochloride*

A mixture of 15 g. of 9-(p-hydroxybenzal)fluorene and 3 g. of sodium methoxide in 100 ml. of tetrahydrofuran was stirred for thirty minutes, then was allowed to reflux with 15 g. of epibromohydrin for two hours. The sodium bromide which separated was removed by filtration. The solvent and excess epibromohydrin were removed under reduced pressure. The residue, 9-[p-(2,3-epoxy-1-propoxy)benzal]fluorene, was refluxed with 8.5 g. of piperidine in 30 ml. of dry benzene. The benzene and excess piperidine were removed and the residue dissolved in ether. The ether solution was washed with ten percent sodium hydroxide and dried over anhydrous magnesium sulfate. Alcoholic hydrogen chloride was added, and the product which separated was recrystallized from ethanol to give 12.4 g. of 9-[p-(3-N-piperidyl-2-hydroxy - 1 - propoxy)benzal]fluorene hydrochloride melting at 247–250° C.

This compound as an analgesic had an $ED_{50}$ activity of approximately 100 mg. per kg. of body weight when administered intraperitoneally to mice. Its $LD_{50}$ toxicity when administered intraperitoneally was in excess of 1000 mg. per kg. of body weight. Toxic symptoms were indicated by hyperirritability at the higher doses.

EXAMPLE III

*9-[p-(3-N-pyrrolidino-2-hydroxy-1-propoxy)benzal] fluorene hydrochloride*

When the piperidine was replaced by pyrrolidine in the procedure of Example II, the hydrochloride salt of 9 - [p - (3 - N-pyrrolidino-2-hydroxy-1-propoxy)benzal] fluorene was obtained (from ethanol-petroleum ether), melting at 249–251° C. This compound had approximately the same analgesic activity as that of the compound of Example 11.

EXAMPLE IV

*9-[p-(3-N-morpholine-2-hydroxy-1-propoxy)benzal] fluorene hydrochloride*

When the piperidine was replaced by morpholine in the procedure of Example II, the hydrochloride salt of 9 - [p - (3 - N-morpholino-2-hydroxy-1-propoxy)benzal] fluorene was obtained (from methanol-isopropanol) melting at 256–258.5° C.

EXAMPLE V

*9-{p-[3-(1,2,5,6-tetrahydro-1-pyridyl)-2-hydroxy-1-propoxy]benzal}fluorene hydrochloride*

When the piperidine was replaced by 1,2,5,6-tetrahydropyridine in the procedure of Example II, the hydrochloride salt of 9-p-[3-(1,2,5,6-tetrahydro-1-pyridyl)-2-hydroxy-1-propoxy]benzal fluorene was obtained (from absolute ethanol) melting at 233–237° C.

EXAMPLE VI

*9-[3-methoxy-4-(3-diethylamino-2-hydroxy-1-propoxy) benzal]fluorene thymolsulfonate hemihydrate*

An ether solution containing one mole of butyllithium was added to 166 g. of fluorene. To this mixture was added 76 g. of vanillin in tetrahydrofuran. More tetrahydrofuran was added while ether was being removed by distillation until a homogeneous solution resulted. The solution was refluxed for three hours, then an excess of concentrated hydrochloric acid was added. The tetrahydrofuran was removed by heating on a steam bath, and the acidic mixture was extracted with ether. The ether layer was extracted with ten percent sodium hydroxide, and the solid sodium salt of 9-(3-methoxy-4-hydroxybenzal)fluorene was removed by filtration. Acidification of this material yielded 20 g. of 9-(3-methoxy-4-hydroxybenzal)fluorene, a new compound.

When the 9-(p-hydroxybenzal)fluorene was replaced with 20 g. of 9-(3-methoxy-4-hydroxybenzal)fluorene in the procedure of Example I, 9-[3-methoxy-4-(3-diethylamino-2-hydroxy-1-propoxy)benzal]fluorene was obtained as an amorphous solid. From this solid was obtained 3.8 g. of 9-[3-methoxy - 4 - (3 - diethylamino - 2 - hydroxy-1-propoxy)benzal]fluorene thymolsulfonate hemihydrate (from methylene chloride-ethyl acetate) melting at 108–110° C.

EXAMPLE VII

9-[p-(3-diethylamino-2-hydroxy-1-propoxy)benzal] xanthene hydrochloride

The Grignard reagent prepared from 86 g. of p-methoxybenzyl chloride in 1200 ml. of ether was added to a suspension of 71.5 g. of xanthone in 400 ml. of dry benzene, and the mixture was refluxed for two hours. After decomposing the complex with dilute hydrochloric acid, the ether solution was evaporated and the residue refluxed with alcoholic hydrogen chloride for three hours. The solvent was removed and the residue triturated with petroleum ether to give yellow crystals of 9-(p-methoxybenzal)xanthene, which, after recrystallization from ethanol-ethyl acetate melted at 104–107° C.

A mixture of 17.6 g. of 9-(p-methoxybenzal)xanthene and 60 g. of pyridine hydrochloride was heated at 215° C. for thirty minutes. The mixture was poured into water and extracted with ether. The ether solution was extracted with ten percent sodium hydroxide, the alkaline extracts were acidified to give 9 - (p - hydroxybenzal)xanthene, which, after recrystallization from benzene-petroleum ether, melted at 181–182° C.

When the 9-(p-hydroxybenzal)fluorene was replaced with 9-(p-hydroxybenzal)xanthene in the procedure of Example I, 9-[p-(3-diethylamino - 2-hydroxy-1-propoxy)-benzal]xanthene hydrochloride (from methylene chloride-ether) was obtained melting at 175–177° C.

EXAMPLE VIII

9-[p-(3-diethylamino-2-hydroxy-1-propoxy)benzyl] fluorene hydrochloride

A solution of 13.5 g. of 9-(p-hydroxybenzal)fluorene in 100 ml. of tetrahydrofuran was hydrogenated using a ten percent palladium on charcoal catalyst at room temperature under three atmospheres of hydrogen until the theoretical amount of hydrogen had been consumed. After removing the catalyst, the solvent was replaced with aqueous ethanol from which 9-(p-hydroxybenzyl)fluorene was obtained melting at 167–168° C.

A mixture of 13.5 g. of 9-(p-hydroxybenzyl)fluorene and 2.7 g. of sodium methoxide was stirred for fifteen minutes. To this suspension was added 13.7 g. of epibromohydrin, and the resulting mixture was heated under reflux for two hours. The sodium bromide which separated was removed by filtration, and the solvent was evaporated under reduced pressure. The residue, 9-[p-(2,3-epoxy - 1 - propoxy)benzyl]fluorene, crystallized from a mixture of ether and petroleum ether and melted at 78–80° C.

A mixture of 9-[p - (2,3 - epoxy - 1 - propoxy)benzyl] fluorene and 7.3 g. of diethylamine in 30 ml. of dry benzene was refluxed for three hours. The benzene and excess diethylamine were removed and the residue dissolved in ether. The ether solution was washed with ten percent sodium hydroxide, water and dried over anhydrous sodium sulfate. Upon acidification of the ether solution with alcoholic hydrogen chloride, 9-[p - (3 - diethylamino-2-hydroxy - 1 - propoxy)benzyl]fluorene hydrochloride separated which, after crystallization from methanol-ethyl acetate, melted at 157–158.5° C.

This compound had an analgesic $ED_{50}$ activity in mice when measured by the hot plate method of approximately 21.5 mg. per kg. of body weight when administered intraperitoncally. The $LD_{50}$ was approximately 179 mg per kg. of body weight when administered intraperitoneally and 840 mg. per kg. when administered orally. In rats, the analgesic $ED_{50}$ by the hot plate method was approximately 55 mg. per kg. of body weight by the intraperitoneal route, and the $LD_{50}$ for rats by the intraperitoneal route was 122 mg. per kg. of body weight.

EXAMPLE IX

9-[p-(3-diethylamino-2-hydroxy-1-propoxy)benzyl]- xanthene hydrochloride

A mixture of 20 g. of 9-(p-methoxybenzal)xanthene and 80 ml. of hydriodic acid containing 1.5 percent hypophosphorous acid was refluxed for three hours and then extracted with ether. The ether was removed and the residue crystallized from ethyl acetate to give 11.3 g. of 9-(p-methoxybenzyl)xanthene, melting at 121–123° C.

When 9-(p-methoxybenzal)xanthene was replaced with 11.3 g. of 9-(p-methoxybenzyl)xanthene in the demethylation procedure of Example VII, 8.4 g. of 9-(p-hydroxybenzyl)xanthene (from benzene-petroleum ether) was obtained melting at 137–138° C.

When the 9-(p-hydroxybenzal)fluorene was replaced with 9-(p-hydroxybenzyl)xanthene in the procedure of Example I, 9-[p-(3-diethylamino-2-hydroxy-1-propoxy)-benzyl]xanthene hydrochloride (from methylene chloride-butanone) was obtained melting at 145–147° C.

EXAMPLE X

9-[p-(3-dimethylamino-2-hydroxy-1-propoxy)- benzal]fluorene hydrochloride

To a solution of 17.5 g. of 9-(p-hydroxybenzal)fluorene in 150 ml. of tetrahydrofuran was added 3.02 g. of sodium methoxide and the resulting solution stirred for ten minutes. To this solution was added 17.5 g. of epibromohydrin. This solution was refluxed for two hours and let stand overnight, after which the precipitated sodium bromide was removed by filtration. The solvent and excess epibromohydrin were removed on a steam bath at reduced pressure. The resulting oil was dissolved in 50 ml. of tetrahydrofuran and cooled to 0° C. To this stirred solution was added 3.15 g. of dimethylamine. Stirring was continued for an hour at 0° and for 24 hours at room temperature. The solution was cooled and filtered from a small amount of insoluble material. The solvent was removed and the oil extracted with ether. The ether solution was washed with a ten percent sodium hydroxide solution and then with water. The ether solution was dried over sodium sulfate and treated with alcoholic hydrogen chloride. The resulting precipitate was recrystallized from ethanol-ether to give 6.3 g. of 9-[p-(3-dimethylamino-2-hydroxy-1-propoxy)benzal]fluorene hydrochloride, melting at 176.5–177.5° C.

EXAMPLE XI

9-[p-(3-dimethylamino-2-hydroxy-1-propoxy)- benzyl]fluorene hydrochloride

To a solution of 0.1 mole of 9-[p-(2,3-epoxy-1-propoxy)benzyl]fluorene in 250 ml. of tetrahydrofuran at 0° prepared as described in Example VIII, was added 10 ml. of anhydrous dimethylamine. The solution was stirred two hours while the temperature rose to room temperature. This treatment with dimethylamine was repeated two more times and the resulting solution stirred overnight at room temperature. The solvent was then removed and the residue dissolved in ether, washed with ten percent sodium hydroxide solution, and finally with water. The ether solution was dried over sodium sulfate and treated with alcoholic hydrogen chloride to give 15.3 g. of 9-[p-(3 - dimethylamino-2-hydroxy-1-propoxy)benzyl]fluorene hydrochloride melting at 186.5–188° C.

EXAMPLE XII

9 - [p - (3 - N - succinimido - 2 - hydroxy - 1 - propoxy)-benzyl]fluorene and 9 - [p - (3 - amino - 2 - hydroxy - 1-propoxy)benzyl]fluorene hydrochloride To a solution of 15.2 g. of 9-[p-(2,3-epoxy-1-propoxy)-benzyl]fluorene and 3.8 g. of succinimide in 10 ml. of hot ethanol was added seven drops of pyridine. This solution was refluxed for eight hours and cooled to give after recrystallizing from ethanol 9-[p-(3,N-succinimido-2-hydroxy-1-propoxy)benzyl]fluorene melting at 168–170° C.

Acid hydrolysis by refluxing with twenty percent hydrochloric acid of 9-[p-(3-N-succinimido-2-hydroxy-1-propoxy)benzyl]fluorene gave, after recrystallization from ethanol, 9-[p-(3-amino-2-hydroxy-1-propoxy)benzyl]fluorene hydrochloride.

EXAMPLE XIII

9-[p-(3-amino-2-hydroxy-1-propoxy)benzal]fluorene hydrochloride

To a solution of 3.26 g. of 9-[p-(2,3-epoxy-1-propoxy)benzal]fluorene and 0.9 g. of succinimide in 20 ml. of hot ethanol was added two drops of forty percent benzyltrimethyl ammonium hydroxide. This solution was refluxed for eight hours and cooled to give 9-[p-(3-N-succinimido-2-hydroxy - 1 - propoxy)benzal]fluorene as an oil which would not crystallize. Acid hydrolysis of the crude 9-p-(3 - N-succinimido-2-hydroxy-1-propoxy)benzal fluorene by refluxing with twenty percent hydrochloric acid, gave after recrystallization from methylene chloride-ether, 9-[p-(3-amino-2-hydroxy - 1 - propoxy)benzal]fluorene hydrochloride.

EXAMPLE XIV

9-[p-(3-ethylamino-2-hydroxy-1-propoxy)benzal]fluorene hydrochloride

A solution of 3.26 g. (0.01 mole) of 9-[p-(2,3-epoxy)benzal]fluorene and 4.5 g. of ethylamine in tetrahydrofuran was heated in a pressure bottle at 60° C. for six hours. The solvent and excess amine were removed under vacuum. The residue was recrystallized from ethyl acetate to give 1.7 g. of 9-[p-(3-ethylamino-2-hydroxy-1-propoxy)benzal]fluorene melting point 166–168° C.

When this base was dissolved in chloroform and the solution treated with the calculated amount of alcoholic hydrogen chloride, the hydrochloride salt of 9 - [p-(3-ethylamino-2-hydroxy-1-propoxy)benzal]fluorene precipitated. The hydrochloride melts at 255–257° C.

EXAMPLE XV

9-[p-(3-benzylmethylamino-2-hydroxy-1-propoxy)benzal]fluorene hydrochloride

When benzylmethylamine is used in place of the piperidine of Example II, the hydrochloride salt of 9-[p-(3-benzylmethylamino - 2 - hydroxy - 1 - propoxy)benzal]fluorene is obtained melting at 178–180° C.

EXAMPLE XVI

9-[p-(3-methylamino-2-hydroxy-1-propoxy)benzyl]fluorene hydrochloride

9 - [p - (3 - benzylmethylamino - 2 - hydroxy - 1 - propoxy)benzal]fluorene hydrochloride was dissolved in ethanol and subjected to hydrogenation at fifty pounds H₂ pressure using ten percent palladium on charcoal as the catalyst. This hydrogenation resulted in cleavage of the N-benzyl group as well as reduction of the benzal double bond. The catalyst was removed by filtration, and the crude product was recrystallized twice from ethyl alcohol to give 9 - [p - (3-methylamino-2-hydroxy-1-propoxy)benzal]fluorene hydrochloride melting at 203–205° C.

EXAMPLE XVII

9-{p-[3-(1,2,5,6-tetrahydro-1-pyridyl)-2-hydroxy-1-propoxy]benzyl}fluorene chloride When 0.05 mole of 9-[p-(2,3-epoxy-1-propoxy)benzyl]fluorene was reacted with 0.1 mole of 1,2,5,6-tetrahydropyridine, as in Example VIII, followed by purification from an alumina column, 2.0 g. of 9-{p-[3-(1,2,5,6-tetrahydro-1-pyridyl) - 2 - hydroxy - 1 - propoxy]benzyl}fluorene hydrochloride was obtained melting at 218–220° C.

EXAMPLE XVIII

9-[p-(3-N-phthalimido-2-hydroxy-1-propoxy)benzyl]fluorene

A mixture of 8.2 g. of 9-[p-(2,3-epoxy-1-propoxy)benzyl]fluorene prepared as in Example VIII, 3.7 g. of phthalimide, two drops of pyridine and 25 ml. of absolute ethanol was refluxed for one hour. After adding 15 ml. more of absolute ethanol and refluxing for two hours, the solution was let stand overnight. The resulting precipitate was recrystallized from ethanol, to give 9-[p-(3-N - phthalimido-2-hydroxy - 1 - propoxy)benzyl]fluorene melting at 145–146.5° C.

We claim:

1. A compound having the formula:

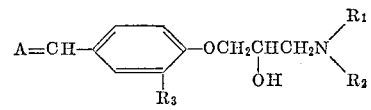

in which $R_1$ and $R_2$ are selected from the group consisting of hydrogen, lower alkyl of from 1 to 4 carbon atoms, benzyl, and further members wherein $R_1$ and $R_2$ together with the —N< constitute piperidino, pyrrolidino, morpholino, tetrahydropyridino, succinimido and phthalimido, $R_3$ is a radical from the group consisting of hydrogen and methoxy, and A represents radicals of the group consisting of 9-fluorenylidene and 9-xanthylidene.

2. 9 - [p - (3 - diethylamino - 2 - hydroxy - 1 - propoxy)benzal]fluorene hydrochloride.

3. 9 - [p - (3 - N - piperidyl - 2 - hydroxy - 1 - propoxy)benzal]fluorene hydrochloride.

4. 9 - [p - (3 - N - pyrrolidino - 2 - hydroxy - 1 - propoxy)benzal]fluorene hydrochloride.

5. 9 - [3 - methoxy - 4 - (3 - diethylamino - 2 - hydroxy-1-propoxy)benzal]fluorene thymol sulfonate hemihydrate.

References Cited in the file of this patent

UNITED STATES PATENTS

| | | |
|---|---|---|
| 2,183,237 | Eckert et al. | Dec. 12, 1939 |
| 2,520,093 | Gross | Aug. 22, 1950 |
| 2,523,177 | Yowell et al. | Sept. 19, 1950 |
| 2,643,259 | Miller et al. | June 23, 1953 |
| 2,742,463 | Finkelstein | Apr. 17, 1956 |
| 2,773,900 | Mills | Dec. 11, 1956 |
| 2,820,797 | Jacob et al. | Jan. 21, 1958 |
| 2,891,957 | Allen et al. | June 23, 1959 |

OTHER REFERENCES

Stephenson: Journ. Chem. Soc., 1954, pages 1571–2.

Elsevier's Encyclopedia of Organic Chemistry, vol 13, pages 35, 46, 49 and 61, Elsevier Publishing Co., Inc., New York (1946).